Patented June 13, 1939

2,161,803

UNITED STATES PATENT OFFICE 2,161,803

PROCESS FOR TREATING RESINOUS BODIES

Emile C. de Stubner, Charleston, W. Va.

No Drawing. Application May 26, 1936, Serial No. 81,913

5 Claims. (Cl. 134—58)

The present invention relates to a process for treating resinous bodies and to products resulting therefrom, and is a continuation-in-part of my co-pending application Serial No. 609,497 entitled Utilization of the solid phase of pulping elements. In one of its aspects the present invention is connected with the creation of incompatibility between the solid phase of a resinous body and a fluid medium and the utilization of such incompatibility for the purpose of forming disperse systems.

It is known, for example, that various types of resinous bodies may be incorporated into various types of plastic and coating compositions if the physical condition of the selected resinous body is such as to render it compatible with a fluid medium forming a part of the plastic or coating composition. In general, such compatibility results when the resinous body is dissolved or dispersed in a fluid medium, usually an organic liquid, which acts as either the solvent or the vehicle of the plastic or coating composition.

In certain instances hereinafter referred to, an incompatibility between the resinous body and the fluid medium has been noticed, and this incompatibility causes a condition of cloudiness or turbidity which is undesirable, particularly in the formation of many plastic or coating compositions. To overcome such condition, in some instances the resinous body has been subjected to preliminary treatment prior to its incorporation into the fluid medium, and portions of the resinous body, believed to be the cause of undesirable cloudiness or turbidity, were eliminated prior to incorporation into the fluid medium. The familiar "dewaxing" of gum dammar prior to incorporation into certain nitrocellulosic plastic or coating compositions, is an example of such preliminary treatment.

As distinguished from such prior processes, the process of the present invention promotes and utilizes the incompatibility of resinous bodies in selected types of fluid mediums for the purpose of forming disperse systems. In so doing, the present invention permits the use of resinous bodies selected from a large field of such bodies, many of which may not now be utilized by reason of the present processes which require removal from such bodies of certain of their constituent elements. In addition, the present invention provides a process for the formation of disperse systems which, by the utilization of the incompatibility of a resinous body for a fluid medium, renders more economical the formation of such disperse systems than the methods now commonly used.

It is, therefore, a principal object of the present invention to provide a process for treating resinous bodies in forming disperse systems, particularly but not exclusively consisting of pigments or finely divided solids dispersed in a fluid medium, the present process effecting and utilizing the incompatibility of certain resinous bodies and selected fluid dispersion mediums, for the purpose of reducing the time and expense required in forming such disperse systems and at the same time utilizing all the constituent elements of the resinous body.

It is a further object of the present invention to provide a process for treating resinous bodies in forming disperse systems in which the process is regulated by controlling and changing the physical characteristic of the admixed resinous body and fluid medium, and by such control and change in physical characteristics to effect the formation of desired disperse systems in which the resinous body may be either in the disperse phase or in the continuous phase.

In one of its aspects a further object of the present invention is to provide an improved process and a product resulting therefrom in which a resinous body may be either incorporated into a vehicle or act as a vehicle for the manufacture of plastic or coating compositions, utilizing in such process the forces causing the incompatibility between the resinous body and the fluid medium of the composition for the purpose of effecting a substantially stable and compatible dispersion consisting of the resinous body, the fluid medium and the other constituents of the disperse system.

It is a further object of the present invention to provide a process for treating resinous bodies in a fluid medium for the purpose of eliminating turbidity or cloudiness resulting from the mixture of resinous or other solid bodies and fluid mediums, without requiring preliminary treatment of the resinous body or impairment of its physical or chemical properties.

The present invention is based upon my observation and discovery that when turbidity and cloudiness in a mixture of a resinous body and a fluid medium occurs, such condition is caused by an action analogous to the precipitation of solids from solutions. My observations lead me to believe that this action probably is due to changes, chiefly of a physical nature, occurring in the resinous body which render the resinous body incompatible with the fluid medium. The present invention is directed particularly to causing and controlling such changes in the resinous body through the fluid medium in order thereby to utilize the incompatibility between the resinous body and the fluid medium and thereby to facilitate the formation of disperse systems containing the resinous bodies as an element thereof.

In carrying out the process of the present invention, I may utilize as the resinous body any substance of a resinous nature which may be either a natural or synthetic resinous body or mixture thereof. By way of example, but not of limitation, such substances may include as natural resinous bodies the group of copals and gums comprising Congo copal, Manila copal, kauri copal, gum dammar, East India copal, shellac, gum accroides, rubber, and the like; or they may be selected from the group of pitches and asphalts, such as coal tar pitch, stearin pitch, candle-tar pitch, cottonseed pitch, naphthalene pitch, rosin pitch, Trinidad or similar asphaltic deposits, gilsonite, manjak, Syrian or Egyptian asphaltum, petroleum residues, still residues resulting from the treatment of oils, fats, naphthalene or homologous compounds, and the like.

In the field of synthetic resinous bodies are included the large number of synthetic compounds known as condensation products, which result from reactions between certain of the organic acids and other selected organic mediums, such products being commercially known as phenol-aldehyde resins, synthetic resins produced by condensing phenol and formaldehyde, commercially known as "Condensite", synthetic resins produced by the action of organic acids on glycerol and commercially known as "Glyptal" resins, ester gums, cumars, coumarones, indenes, synthetic rubber, etc.; or they may include resinous bodies such as gum factis, sulfonated oils, blown oils, oxidized oils and polymerized oils, and the like, which result from the processing of selected oils.

The foregoing and many other resinous bodies are important ingredients, particularly in the formation of plastic and coating compositions, and may be utilized in the paint, varnish, enamel and allied fields by incorporating resinous bodies as constituents of the coating compositions and utilizing them as film-forming components or in some instances as fillers in a film-forming component. In order to utilize the resinous bodies in either of these ways in the paint, varnish, enamel and allied fields, it is necessary to have the resin, at some stage of the process, in its liquid phase, either dissolved or dispersed in a suitable fluid vehicle.

The foregoing and other similar substances are included within the term "resinous body" as used throughout the present specification, and such term is intended to cover both natural and artificial mixtures of organic substances of a resinous or resin-forming nature which are soluble in selected solvents and which may be separated from such solvents as a solid which is fusible and which softens gradually when subjected to heating. These properties are common physical properties possessed by the foregoing named resinous bodies without regard to their particular chemical properties and it is such physical properties rather than the chemical properties of such resinous bodies that are utilized in carrying out the present process.

In one aspect of the present process, the selected resinous body may be converted from its solid or plastic phase to a controlled and predetermined state of plasticity and thereafter, if desired, to a solution in a fluid solvent medium. In other instances the resinous body may be put in solution with a solvent and thereafter be precipitated therefrom as a solid or plastic mass upon disturbing the balance between the resinous mass and the solvent.

The fluid solvent mediums which may be employed in the present process and are hereinafter referred to as the solvent agent, comprise the large group of organic or other solvents which act as a solvent for the selected resinous body. The following fluids may act as solvent agents and are mentioned by way of example, but not of limitation, as illustrative of the wide field of selection made possible by the present process. As the solvent agent, I may use toluene, turpentine, benzene, solvent naphtha (xylenes), alcohol, and the like, depending upon the particular resinous mass to be used in the process.

In carrying out the process I also use agents which are effective to precipitate the resinous body from the fluid solvent and such agents are selected from a large group which will act to effect a state of incompatibility between the solvent agent and the resinous body. These agents are hereinafter referred to as precipitating agents and are chiefly fluids which are miscible with the solvent agent employed. Such agents may include, for example, alcohols, gasoline, water, or watery solutions of inorganic substances, and the like. If, in carrying out the process, the precipitating agent is to be removed from the mass by distillation, its boiling point or vapor tension should be less than that of the solvent agent.

It is immaterial to the carrying out of the present invention whether the "solution" between the resinous mass and the solvent medium is a "true" solution or whether it is a "molecular" or "colloidal" solution, and the term "solution" as used herein shall be deemed to cover all of the foregoing types.

In using the process of the present invention for the purpose of incorporating finely divided solids, such as pigments or fillers, into a fluid carrying medium which contains the resinous body, it is important that the fluid medium of the final dispersion is a compatible mixture of the resinous body and a liquid solvent therefor. The provision of such compatible mixture and the dispersion of the finely divided solids therein is a particular application of the present invention which will now be described by way of example and not by way of limitation.

In providing the final dispersion medium which contains the resinous body and the fluid solvent, the resinous body is so controlled as to form a fluid dispersion medium which, at the conclusion of the process, acts as the vehicle or film-forming component of the plastic or coating composition. During the carrying out of the process, however, the resinous mass may become interchangeably either the disperse phase or the dispersion medium.

In forming the resin-containing dispersion medium the resinous mass is processed while in its solid or plastic phase by working the mass with a selected solvent medium of such nature and in such quantity as to maintain the resinous mass in a predetermined degree of plasticity, while incorporating the finely divided solids therein.

In carrying out the invention, the ingredients to be used in forming the final disperse system are placed in an apparatus such as described in my co-pending application Serial 609,497, which consists of a jacketed kneading machine of the type of the Werner & Pfleiderer or similar type kneading machine having power driven hollow agitating blades enclosed to permit the carrying out of distillation therein. A condenser may be attached to a still neck in the cover of the machine, so that during operation of the machine a distillation operation may be carried out in the kneading machine either at atmospheric, increased or diminished pressure. An inlet valve is provided through the kneading machine to permit feeding the ingredients into the machine for its continuous operation. Suitable apparatus is provided for measuring the temperatures of the contents in the machine, as well as of the vapor in the still neck.

In utilizing the present invention to obtain, by way of example and not of limitation, a white synthetic resin enamel of the "Glyptal" type or of the modified glycerol-phthalic anhydride type commercially known as "Rezyl", which is generally known as "synthetic enamel" and which is to be pigmented by the pigment titanium white, a suitable quantity of gum dammar (Singapore variety) is dissolved in toluene to form a concentrated solution which is filtered. The solution may not be sharp and brilliant, but this does not affect the carrying out of the present process as this appears to be due to the moisture content of the gum dammar. The gum dammar solution and the titanium white pigment are added to the kneading machine and are worked until a uniform mix is obtained. The kneading machine is preferably operated at a speed of about 60 R. P. M. and at a temperature of approximately 85° C. until the mix becomes quite heavy and is about the consistency of mashed potatoes. At this point the machine has operated purely as a mixing machine as the mass does not possess sufficient plasticity to cause a kneading of the mass in the machine.

It is a known phenomenon that a resinous mass may be precipitated from such a mixture by the addition of alcohol. This resinous constituent of the gum dammar which is precipitated by alcohol is commonly referred to as the "wax" and has not been utilized in prior processes for producing such a composition. In fact, the gum dammar usually is subjected to a "dewaxing" process prior to its incorporation into the plastic or coating composition. The gum dammar which has been specified for use in the present process is gum dammar which has not been subjected to a preliminary treatment and therefore contains the fraction generally known as the "wax". This precipitated fraction is not, strictly speaking, a "wax" but is rather the Beta resin of gum dammar and is a desirable constituent in the compositions produced by the present process. In carrying out the present invention there is added to the mixture of gum dammar solution and titanium white, a sufficient quantity of denatured alcohol to precipitate this resinous fraction of the gum dammar in its solid or plastic phase from the admixture of gum dammar solution and titanium white. Under the conditions specified, this resinous fraction of the gum dammar cannot settle out of the mixture due to the stiffness of the mass, so that by the addition of the mobile and very fluid alcohol, the batch becomes very stiff and assumes the dough-like character of a very stiff plastic. Upon operation of the kneading machine, the rotating blades now function as kneading blades and knead and work the stiff plastic mass in the machine so that the precipitated gum dammar particles, the titanium white pigment, and the dissolved gum dammar fraction which is not precipitated by the alcohol, are all worked together to become a very uniform mixture.

Due to the presence of the alcohol, the mixture in the kneading machine may be further treated to remove the alcohol after the desired degree of dispersion is achieved. To effect removal of the alcohol, the temperature in the kneading machine is raised, either by the circulation of a heated fluid through the jacketed chamber and the blades, or otherwise, to the point where the alcohol is distilled off the batch and is caught in the condenser and reclaimed for further use. Upon the distillation of the alcohol, the precipitated solid phase of the gum dammar which has been utilized to increase the plasticity of the mass and thus to facilitate the kneading action, then reenters the original toluene solution and becomes with it a homogeneous and uniform liquid vehicle and carrier acting as a dispersion medium for the titanium white pigment which will be found to be uniformly dispersed therethrough. This white concentrate may now be extended and diluted with a "Glyptal" or other resin solution so as to yield a white synthetic enamel in proper form for application in any desired manner to any particular type of surface. The actual process of extending and diluting this white concentrate can be carried out in various ways; for example, during the distillation of the alcohol from the mixture, a solution of "Glyptal" or other resinous oily vehicle, or an ethyl, methyl or propyl alcohol-free solution of nitrocellulose and plasticizer, may be added to take the place of the displaced alcohol and thus produce a great variety of end or consumer products in which the film-forming components are mixtures of gum dammar, nitrocellulose, "Glyptal", "Rezyl", or other resinous bodies in various proportions. In carrying out the distillation of the alcohol, the temperature of the mass in the kneading machine is regulated so that the machine operates as a fractional distillation unit, separating the alcohol from the mixture without separating the toluene therefrom.

In the foregoing example it is proposed to add the titanium white pigment in its usual commercial form as a dry pigment. If desired, the titanium white may be processed while still in the water-wet condition at a stage in its manufacture in accordance with the disclosure of my United States Patent No. 1,866,017 and form an alcoholic pulp in which the titanium white pigment particles are pulped in an alcoholic pulping medium. This procedure is recommended for the purpose of saving the cost of dehydration, grinding, etc., which otherwise is required by conventional processes for the manufacture of the titanium white pigment. In addition, such process possesses the desirable advantage of maintaining the individual pigment particles in their precipitate size and without adversely affecting the dispersion of such particles in the pulping medium.

When the pigment is used in the form of the alcoholic pulp, it will not be necessary to add alcohol for the purpose of increasing the plasticity of the mass in the kneading machine as the alcohol in the pigment pulp will act as the precipitating agent for the solid phase of the alcohol insoluble fraction of the gum dammar in precisely the same manner as that heretofore described.

In the foregoing example it will be noted that I utilize the precipitated solid phase of the gum dammar in the presence of the liquid medium in which the precipitated phase of the gum dammar originally was in solution, and this precipitation is effected without removing the dissolved portion of the gum dammar from the liquid medium in which it is in solution. In certain instances it may be desirable to first separate the fraction of the gum dammar which is precipitated by the addition of alcohol and utilize such precipitated fraction as a dispersing medium agent to process solids in the production of coating compositions. What is true of such a fraction of the gum dammar is true of certain fractions of other types of resins which may be precipitated from a solvent by adding a precipitating agent thereto. For example, in the use of "Rezyl" or "Glyptal" resins which have been placed in solution in toluene, the solid phase may be precipitated by the addition of a non-solvent for the resin, such non-solvent belonging to the family of the petroleum hydrocarbons, such as gasoline, naphtha, petroleum spirits, and the like. This precipitating action of the non-solvents may be utilized as follows, the following example being by way of example but not of limitation.

To a solution of 40 parts of a selected "Rezyl" or "Glyptal" resin and 60 parts of toluene, 100 parts of gasoline are added while the solution is being agitated in the kneading machine heretofore described. During the early stage of the addition of the gasoline, it will be noted that the resin precipitates from the solution at the point where the stream of gasoline strikes the solution, but as long as there is an excess of toluene the precipitate immediately reenters the solution. When, however, the gasoline is added in excess, a resinous fraction separates as a precipitate and forms in a mass similar to a ball of yarn. This resinous mass will be found to be covered with a wetted skin formed by the gasoline as the precipitating agent. The precipitated resinous mass floats or is suspended in the kneading machine in a mixture of solvent and non-solvent liquids.

A suitable quantity of carbon black is now added to the mixture in the kneading machine and immediately acts to absorb the admixed liquids. The quantity of carbon black added is regulated by the consistency of the mass as it is worked by the blades in the kneading machine. This is gauged by the appearance of the mass, for when the proper amount of carbon black is added, the mass becomes a plastic similar to crumbling putty.

The mass is thereafter worked in the kneading machine until a sample of the batch worked into a clear solution of the resin in toluene shows that the carbon black is dispersed and deflocculated. In making this test, the quantity of resin solution to sample taken from the batch should be about 10 parts of resin solution to 1 part of the sample. This proportion is regulated in such a manner as to overcome any precipitating influence of the gasoline by reason of the large amount of toluene in the test resin solution.

When the test shows a satisfactory dispersion, the batch is thinned or extended with a clear "Glyptal" resin-toluene solution, and if the gasoline is an undesirable constituent of the end product, it may be either completely or partially distilled off by fractional distillation as heretofore described. The resultant product is a "Glyptal" or "Rezyl" resin synthetic enamel, colored or pigmented with solid carbon black particles.

In the foregoing examples, the present invention is described by way of illustration in processes which utilize a non-solvent for the resin as a precipitating agent to obtain a resinous body in its solid phase from a solution of the resinous body in a suitable solvent. In carrying out the process, the definite balance between the solvent and the non-solvent must be disturbed in favor of the non-solvent in order to cause the precipitation of the solid phase of the resinous body, because as long as the solvent power is stronger than the precipitating power of the non-solvent, the solid phase of the resin will be retained in the solution. As a result of this regulation of the balance between the solvent and the non-solvent, the solution may again be reestablished by the addition of sufficient of the solvent to overcome the precipitating power of the non-solvent. This is illustrated by way of example but not by way of limitation in the following embodiment of another process of the present invention.

Commercial dry pigment such as Prussian blue or Chinese blue, is thoroughly wetted with a mixture of gasoline and toluene in such a proportion as to balance the solvent power of the toluene and the precipitating power of the gasoline with relation to the "Glyptal" or "Rezyl" resin in which the pigment is to be incorporated. This balance is determined by dissolving the selected resin in a clear solution with toluene, which upon addition of the gasoline becomes turbid and which turbidity in turn disappears upon the addition of more toluene.

The mixture of toluene and gasoline and pigment may be ground on a pebble mill, burr mill, colloid mill, or the like, to obtain a thorough wetting or pulping of the Prussian blue in the gasoline-toluene mixture. This mixture is added to the kneading machine described in the prior examples, and while being agitated or worked the selected resinous body, either in its solid, plastic, or viscous phase, or as a concentrated solution, is added to the mixture in the kneading machine. This addition of the resinous body, which is in the pulp form, forms with the Prussian blue a plastic mass of about the consistency of putty or even slightly stiffer than putty. Therefore, in order to continue the mixing, a heavy-duty mixer of the kneading type is required, and the thoroughly wetted pigment particles can now become thoroughly incorporated into the resinous body which is still in the undissolved condition because of the action of the gasoline in preventing its being dissolved by the toluene in the mixture.

The mass is worked until a sample, upon the addition of toluene, shows that the pigment is dispersed in the solution which results from the dissolving of the resinous body. When this condition has been reached, additional toluene is added to the mixture in the kneading machine and the resin is dissolved in the toluene. If desired, the gasoline in the mixture may be removed by fractional distillation.

In the foregoing example, the balanced mixture of solvent agent and precipitating agent acts in the process by reason of the continual exchange of energies between the solvent agent and the precipitating agent on the solid phase of the resin leading to the precipitation and subsequent restoration of the resin to the solution. Thus the change in the physical state of the resin can be carried out and repeated without the necessity of individual separation at the end of each cycle inasmuch as the reaction occurs while all of the precipitants of the previous reaction cycle are present in the mixture, the action in this respect being analogous to the action of litmus paper which can be repeatedly changed in color by the contents of the same beaker without emptying the beaker merely by the addition of such alkaline or acid substances as are required to balance the solution or to upset the balance of the solution which causes the change in color of the litmus paper. This feature of the present invention may be illustrated by way of example, but not of limitation, as follows:

Shellac, which is soluble in alcohol and also in an aqueous borax solution, is put in solution in alcohol. Water or a watery alcoholic solution is added to the solution and the solution becomes cloudy and turbid, after which the shellac precipitates from the solution. Upon the subsequent addition of enough sufficiently strong or absolute alcohol, the original state of shellac in solution can be reestablished. If the shellac is put in solution with aqueous borax, the shellac may be precipitated from the solution upon the addition of an acid, such as hydrochloric acid or formic acid and will reenter the solution when sufficient aqueous borax is added to restore the balance. Also, the borax-shellac solution may be added to an alcohol-shellac solution and cause a precipitation of the shellac therefrom. Such mixtures can be processed with pigments, fillers, or the like, as previously described, and the changes in the physical character of the shellac utilized to control the kneading or mixing action of the machine.

In all of the foregoing examples, it is to be observed that the present invention is closely related to the phenomenon of compatibility and incompatibility of selected resinous bodies and selected fluid mediums. The results which are obtained by the carrying out of the present invention result from the control of the fluid medium in such a manner that the solvent or the precipitant thereof may either predominate or be suppressed, each by the other, or may be balanced at predetermined intervals so as to maintain the resinous body in a predetermined physical state.

In the art of compounding coating compositions, a state of incompatibility among the constituents of a formula is the condition which is most frequently encountered by the compounder. This state is constantly avoided because of the difficulty to reestablish the desired homogeneous condition of the mass after separation of any constituent thereof. The present invention, in contra-distinction to prior practice, intentionally causes incompatibility between the several elements of the coating composition during various stages in its formation for the purpose of utilizing both the latent and the potential energies present in the mass which are manifest by the states of compatibility and incompatibility between the various elements of the composition.

It is to be understood that it is not necessary to cause the resinous body to be placed in solution prior to its utilization in the present process. The resin may be utilized in its solid phase in the presence of a solvent therefor by admixture of the solvent with a non-solvent or precipitant for the resin, in such a balanced solution that the solvent effect on the resin is suppressed and the resin is maintained in its solid phase during the kneading action.

I believe that it is the utilization of the solid phase of the resin which effects the improved dispersions of the dispersed particles in the present process. After having functioned in its solid phase to assist in effecting the dispersion, the resinous mass may be put into solution and become the dispersion medium by changing the balance between the solvent agent and the precipitating agent by the addition of more solvent agent or removal of some of the precipitating agent. However, during the carrying out of the process, the resinous body may have acted either as the disperse phase or as the dispersion medium.

The present invention thus utilizes the forces manifest in the compatibility and incompatibility of a resinous mass and a fluid mass, to effect dispersions of finely divided solids in the resinous mass and the fluid mass. The resinous mass, as has been seen, may be precipitated from the fluid mass, or may exist in its solid phase in the presence of the fluid mass without adversely affecting its dispersion or solution in the final product. The control over the compatibility or incompatibility of the resinous mass and the fluid mass lies chiefly in regulating the balance between the solvent agents and the precipitating agents.

I claim:

1. In the production of a colored coating composition in a resinous base, a process which comprises admixing insoluble coloring matter and the resin component of the base in solution, adding thereto a liquid which is a non-solvent for the resin and which is miscible with the solvent for said resin in sufficient amounts to precipitate the resin from the solution to form a mass of plastic consistency, kneading said mass, and thereafter extending and diluting the resultant mass by admixing therewith solvents for the resin.

2. A process of dispersing insoluble coloring matter in the resinous base of a coating composition which includes the novel steps of admixing the insoluble coloring matter with a solution of the resinous base, precipitating the resinous compound from the said admixture by adding thereto a liquid agent which is chemically inert toward the resinous base and a non-solvent therefor but which is miscible with the solvent for the resinous base, to precipitate the resinous base from the solution and to form from the admixture a mass of a plastic kneadable consistency, kneading said mass until the coloring matter is dispersed therein to the desired degree and thereafter extending and diluting the mass by admixing therewith a sufficient quantity of a solvent for the resinous base to restore said base to solution.

3. The process of dispersing coloring matter into a dispersion medium containing a resin, which comprises admixing insoluble coloring matter with a solution containing the resinous component of the said dispersion medium and a solvent therefor, thereafter adding a liquid miscible with said solvent and which is a non-solvent for the resinous component and chemically inert relative thereto in sufficient amounts to separate a portion of the resinous component from the solution to form from the admixture a plastic mass of kneadable consistency, thereafter kneading such plastic mass to disperse the coloring matter therein, and thereafter extending the mass by working into the mass a solvent for the separated portion of the resinous component thereby to restore the separated portion of the resinous component to a solution in which the coloring matter is substantially uniformly dispersed.

4. A process for dispersing insoluble pigments in a resin containing dispersion medium which includes the steps of providing a solution of the selected resin in a solvent therefor, wetting the pigment with a wetting agent selected from the group of wetting agents which are miscible with the solvent of said solution and which are chemically inert relative to the resin in said solution and non-solvents therefor and which when added to the solution cause the resin to precipitate from the solution, admixing the resin solution and the wetted pigment to precipitate the resin from the solution and form a plastic mass of kneadable consistency, kneading the mass until the pigment is uniformly dispersed therein, and thereafter restoring the resin to solution by admixing with the mass additional solvent for said resin.

5. A process for dispersing insoluble pigments in a resin containing dispersion medium which includes the steps of providing a solution of the selected resin in a solvent therefor, wetting the pigment with a wetting agent selected from the group of wetting agents which are non-solvents for the resin in said solution and which when added to the solution cause the resin to precipitate from the solution, admixing the resin solution and the wetted pigment to precipitate the resin from the solution and form a plastic mass of kneadable consistency, kneading the mass until the pigment is uniformly dispersed therein, and thereafter restoring the resin to solution by admixing with the mass additional solvent for said resin.

EMILE C. de STUBNER.